(12) United States Patent
Ulgen

(10) Patent No.: US 9,586,660 B2
(45) Date of Patent: Mar. 7, 2017

(54) GYROSCOPIC ROLL STABILIZING DEVICE FOR MARINE VESSELS AND METHOD FOR SAME

(71) Applicant: Mehmet Nevres Ulgen, Istanbul (TR)

(72) Inventor: Mehmet Nevres Ulgen, Istanbul (TR)

( * ) Notice: Subject to any disclaimer, the term of this patent is extended or adjusted under 35 U.S.C. 154(b) by 0 days.

(21) Appl. No.: 14/743,592

(22) Filed: Jun. 18, 2015

(65) Prior Publication Data

US 2016/0347429 A1     Dec. 1, 2016

(30) Foreign Application Priority Data

May 25, 2015    (TR) .................................. 2015/06295

(51) Int. Cl.
*B63B 39/00*     (2006.01)
*B63B 43/02*     (2006.01)
*B63B 39/04*     (2006.01)

(52) U.S. Cl.
CPC .................... *B63B 39/04* (2013.01)

(58) Field of Classification Search
CPC ...... B63B 39/00; B63B 39/04; B63B 2039/00
USPC ......................................... 114/122
See application file for complete search history.

(56) References Cited

U.S. PATENT DOCUMENTS

| | | |
|---|---|---|
| 769,493 A | 9/1904 | Schlick |
| 1,186,856 A | 6/1916 | Sperry |
| 1,330,503 A * | 2/1920 | Thompson ............... B63B 39/04 33/323 |
| 1,558,720 A * | 10/1925 | Thompson ............... B63B 39/04 114/122 |
| 1,655,800 A * | 1/1928 | Schein ..................... B63B 39/04 188/171 |
| 1,709,457 A * | 4/1929 | Boykow ................. B64C 17/06 114/122 |
| 1,730,941 A * | 10/1929 | Myers ..................... B63B 39/02 114/124 |
| 2,046,735 A * | 7/1936 | Frisch ..................... B63B 39/04 114/122 |
| 2,130,929 A * | 9/1938 | Rocard .................... B63B 39/14 114/122 |
| 2,202,162 A * | 5/1940 | Minorsky ............... B63B 39/06 114/122 |
| 5,628,267 A | 5/1997 | Hoshio et al. |
| 6,619,221 B2 * | 9/2003 | Umemura ............... B63B 39/04 114/121 |
| 6,973,847 B2 | 12/2005 | Adams et al. |

(Continued)

FOREIGN PATENT DOCUMENTS

EP    2821337 A1    1/2015

*Primary Examiner* — Daniel V Venne
(74) *Attorney, Agent, or Firm* — Vidas, Arrett & Steinkraus, P.A.

(57) ABSTRACT

A gyroscopic roll stabilizing device for a marine vehicle includes a base communicating with a gyroscopic component which includes a rotor rotatable about an axis, a motor for rotating the rotor about the axis, a swing container swinging about a swing axis and having the rotor communicating thereto, a first support member and a second support member being opposite to the first support member for swingingly supporting the swing container. An actuating member rotates the gyroscopic component about an axis around which the rotor does not swing in its free state.

9 Claims, 8 Drawing Sheets

(56) References Cited

U.S. PATENT DOCUMENTS

| | | | | |
|---|---|---|---|---|
| 7,240,630 B2* | 7/2007 | Akers | .................... | B63B 39/04 |
| | | | | 114/122 |
| 8,776,709 B2* | 7/2014 | Gonzalez | ............... | B63B 39/04 |
| | | | | 114/121 |
| 2004/0244513 A1* | 12/2004 | Adams | ................... | B63B 39/04 |
| | | | | 74/5.47 |
| 2007/0272142 A1* | 11/2007 | Nedwed | ................ | B63B 39/04 |
| | | | | 114/122 |

* cited by examiner

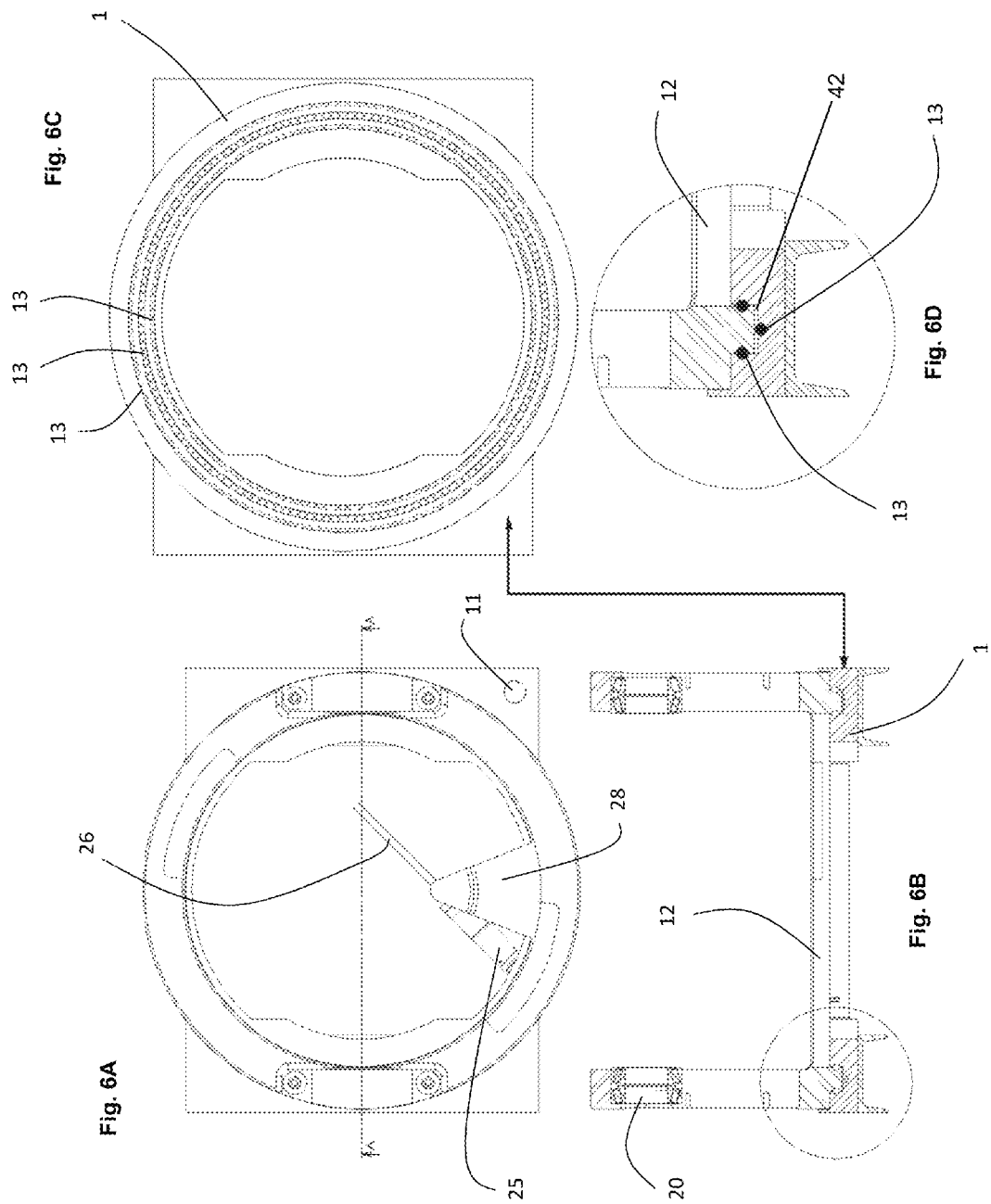

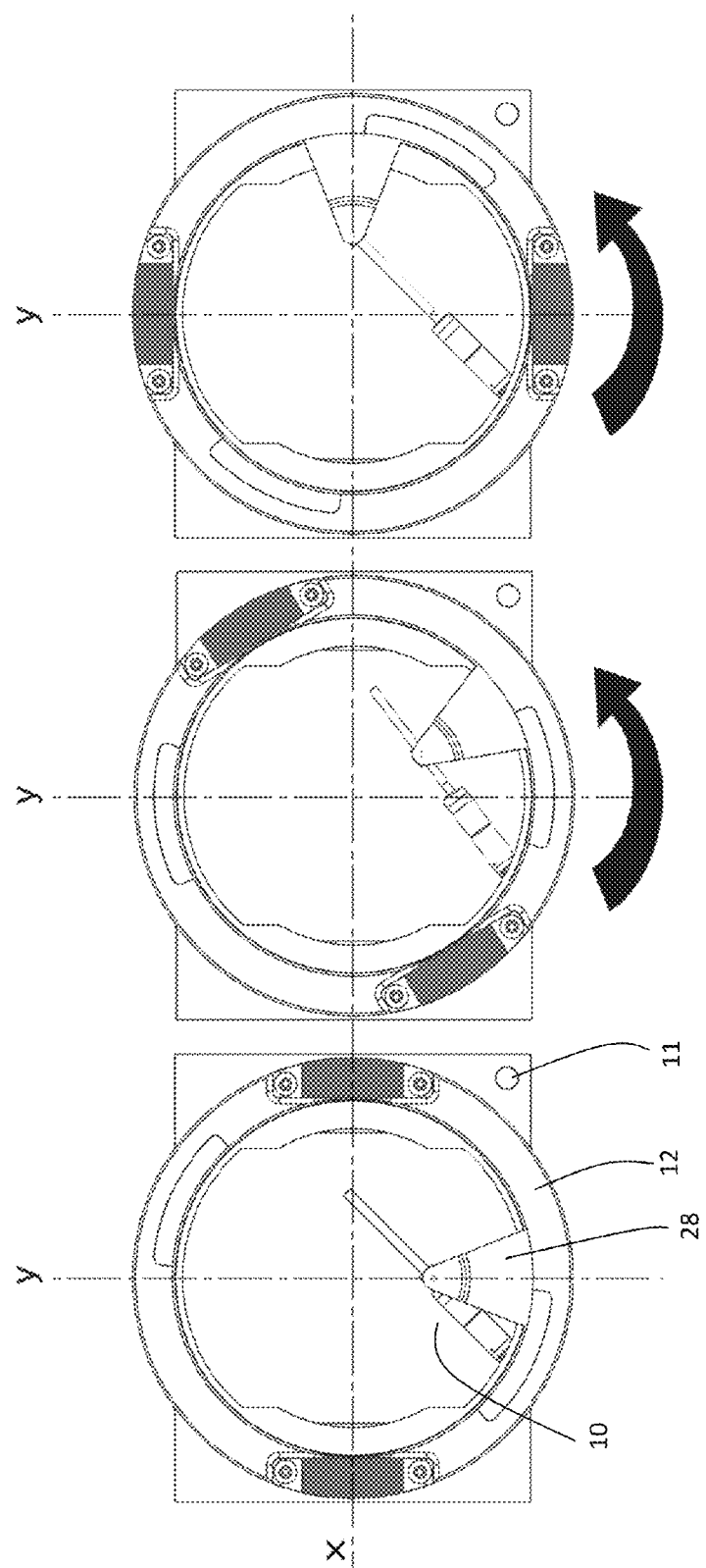

GYROSCOPIC ROLL STABILIZING DEVICE FOR MARINE VESSELS AND METHOD FOR SAME

TECHNICAL FIELD

The present invention relates to a gyroscopic device which stabilizes roll along bow-stern axis (longitudinal axis) and port-starboard axis (transversal axis) for marine vessels.

BACKGROUND OF THE INVENTION

Gyroscope usage has been known for many years for dynamic stabilizing of marine vessels which roll with the sea waves. Gyroscope essentially comprises a base, cylindrical rotor, two oppositely arranged bearing supports and a swing container communicating the rotor pivotally with the bearing supports.

When an input force is applied to the rotor axis, the gyroscopic effect forms an output force perpendicular to the input force and this output force creates a moment on an object contacted with the gyroscope, which can be used to keep the object in stable state. Indeed, with the "Control Moment Gyro" device disclosed in U.S. Pat. No. 769,493 dated 1906, it is shown that high control moments are obtained by precession of stored angular momentum and it is suggested for the use of the control moments in order to stabilize a rolling boat.

Roll of a marine vessel on water occurs in longitudinal axis (bow-stern axis) and transversal axis (port-starboard axis) and roll stabilizing devices are generally fixed within the hull of the marine vessel in order to stabilize roll around the longitudinal axis (U.S. Pat. No. 6,973,847, U.S. Pat. No. 5,628,267). In that case, passengers get discomforted as the rolling around the transversal axis of the boat cannot be not damped dynamically.

Even though an additional stabilizing device (fixed by rotating 90° to the other stabilizing device balancing the roll in longitudinal axis) is used in order to stabilize roll around the transversal axis, such usage is exceptional as it increases the weight of the boat. Besides the weight-increase disadvantage, using two different stabilizing devices along two axes brings an expensive solution due to the necessity of additional equipment.

BRIEF DESCRIPTION OF THE INVENTION

An object of the present invention is to dynamically stabilize the roll around the transversal and longitudinal axes of a marine vessel effectively.

In order to fulfil the objective, the invention relates to a gyroscopic roll stabilizing device for a marine vehicle, comprising a base communicating with a gyroscopic component comprising a rotor rotatable about an axis, a motor for rotating the rotor about the axis, a swing container swinging about a swing axis and having the rotor communicating thereto, the base having a first support member and a second support member being opposite to the first support member, the first support member and the second support member for swingingly supporting the swing container. The invention comprises an actuating mechanism rotating said gyroscopic component about an axis around which the rotor does not swing in its free state.

Swinging of the swing container is preferably provided by an active torque device, while it can be provided by a passive precession brake.

The gyroscopic roll stabilizing device according to the invention also comprises sensors that sense roll around the longitudinal and transversal axes of the marine vessel, and an electronic controller to activate the actuating mechanism in response to the data provided by the sensors. The highest roll direction is determined by the sensors and the actuating mechanism is moved, the gyroscopic component is then rotated to that direction and the roll is stabilized by swinging the rotor by the torque applying device around the swing axis.

The invention also relates to a method stabilizing roll of a marine vessel. The method comprises steps of detecting rolls around the longitudinal axis and transversal axis of the marine vessel; determining a resultant intensity and direction of the detected rolls; rotating the gyroscopic component to the determined direction when the resultant roll intensity is higher than a threshold value; and damping the roll.

BRIEF DESCRIPTION OF THE FIGURES

The present invention should be evaluated with the figures described below to ensure the best understanding of the embodiment and advantages together with the additional elements of the invention.

FIG. 6A is the top view with the gyroscopic device removed;

FIG. 6B is the front sectional view with the gyroscopic device removed;

FIG. 6C is the top view of the base and balls;

FIG. 6D is the partial sectional view of the base and the rotating platform;

FIG. 7A is the top view of the rotating platform positioned in response to a roll around the longitudinal axis of the marine vessel;

FIG. 7B is the top view of the rotating platform positioned in response to a roll around an axis between the longitudinal axis and the transversal axis of the marine vessel;

FIG. 7C is the top view of the rotating platform position for the roll around the transversal axis of the marine vessel;

REFERENCE NUMBERS OF THE PARTS IN THE FIGURES

Figure 1:
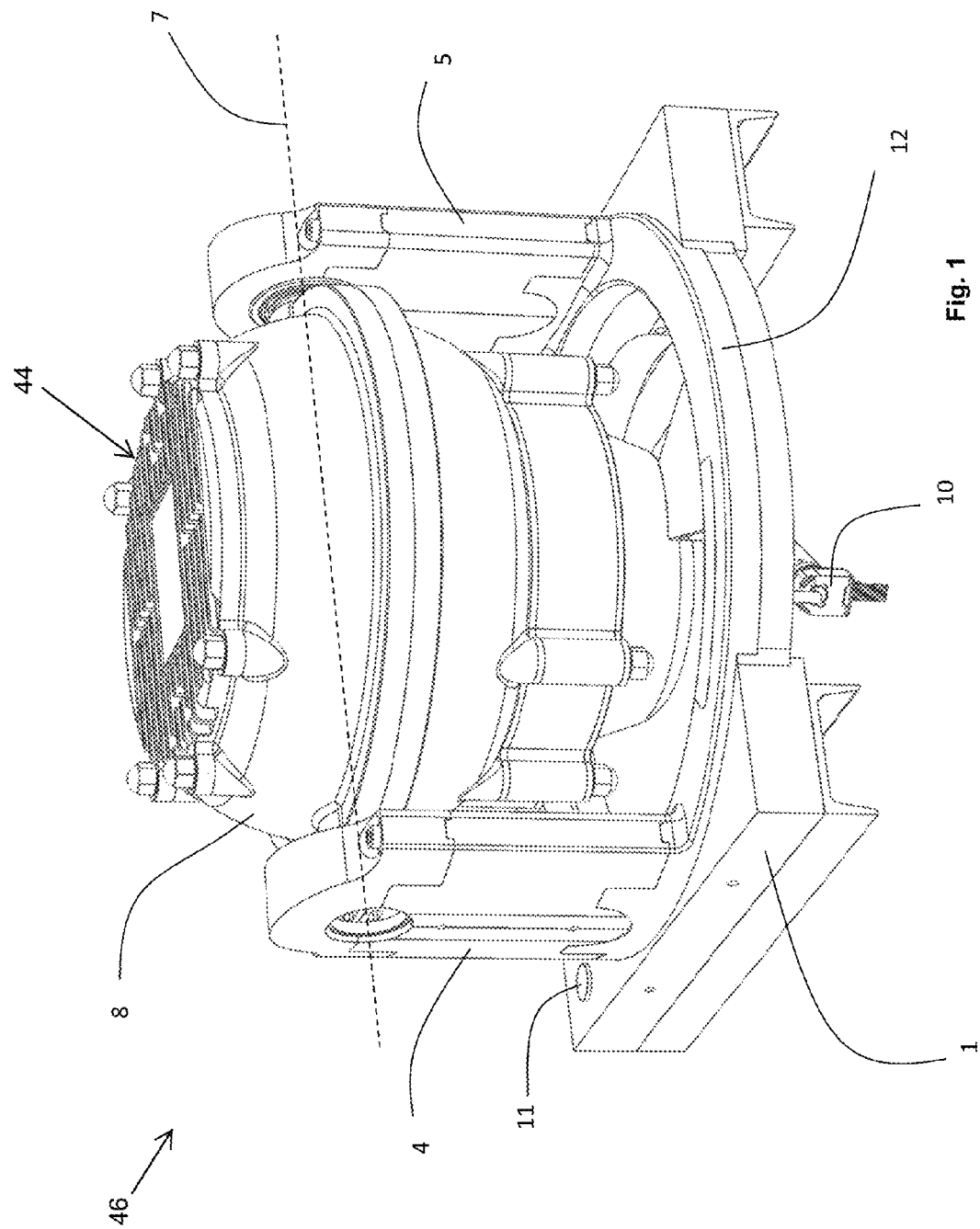
FIG. 1 is the perspective view of the roll stabilizing device according to the invention.

1 Base
2 Rotor
3 Motor
4 First support member
5 Second support member

6 Rotor rotation axis
7 Swing axis
8 Swing container
9 Torque applying device
10 Actuating mechanism
11 Sensor
12 Rotating platform
13 Ball
15 Torque shaft
17 The axis corresponding to the state where the rotor does not swing
18 Rotor shaft
19 First rotor shaft bearing
20 Second rotor shaft bearing
21 First container bearing shaft
22 Second container bearing shaft
23 Torque shaft gear
24 First container bearing shaft gear
25 Actuating mechanism motor
26 Actuating mechanism shaft
27 Actuating mechanism slide
28 Rotating platform connector
29 Rotor upper part
30 Rotor lower part
31 Rotor upper inner part
32 Rotor lower inner part
33 Rotor upper part connection surface
34 Rotor lower part connection surface
35 Rotor connection holes
36 Rotor upper part housing
37 Rotor lower part housing
38 Rotor upper part inner wall
39 Rotor upper part outer wall
40 Rotor lower part inner wall
41 Rotor lower part outer wall

DETAILED DESCRIPTION OF THE INVENTION

Gyroscopic roll stabilizing device (46) according to the invention generally comprises a base (1) fixed to the marine vessel hull (for example on an appropriate place on the longitudinal axis), a gyroscopic component (44) swinging around a swing axis and an actuating mechanism which can pivot the gyroscopic component (44) around an axis (17) of the rotor in its free state where the gyroscopic component (44) does not swing.

The gyroscopic component (44) comprises a rotor (2) which is mounted on a rotor shaft (18) rotating around a rotor rotation axis (6). A swing container (8) surrounds the rotor (2) and communicates with a first rotor shaft bearing (19) and a second rotor shaft bearing (20) which is oppositely arranged with one another relative to the swing container (8). The swing container (8) has a circular shape and has a first container bearing shaft (21) extending outwardly from the swing container (8) and a second container bearing shaft (22) extending outwardly from the swing container (8) where the first container bearing support (21) and the second container bearing support (22) are located opposite to each other. The first container bearing shaft (21) communicates with a first support member (4) located at the side of the swing container (8) providing swinging positioning relative thereto. Similarly, the second bearing shaft (22) communicates with a second support member (5) located on the other side of the swing container (8) providing swinging positioning relative thereto.

Figure 2:
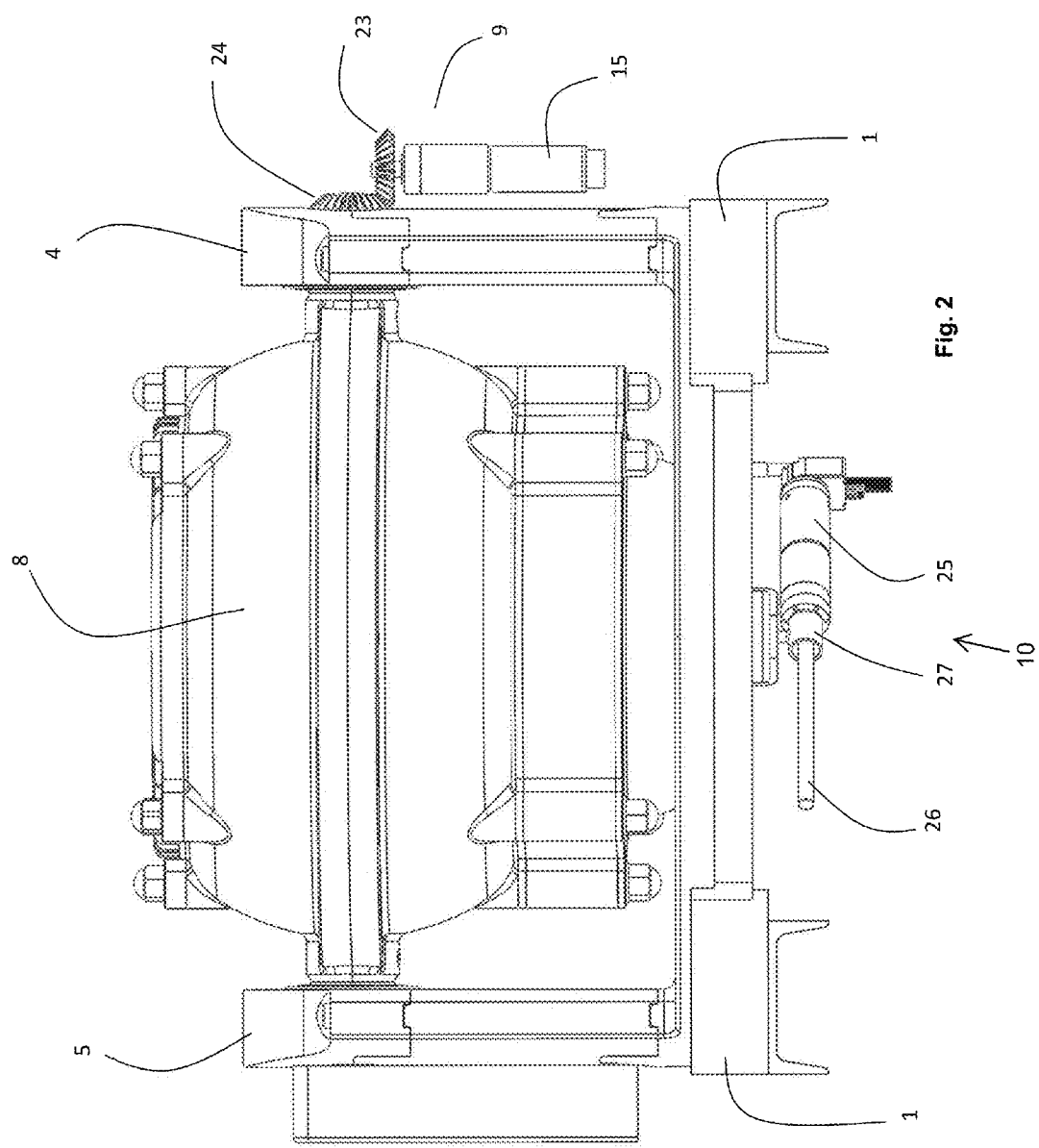
FIG. 2 is the front view of the roll stabilizing device according to the invention.
Figure 3:
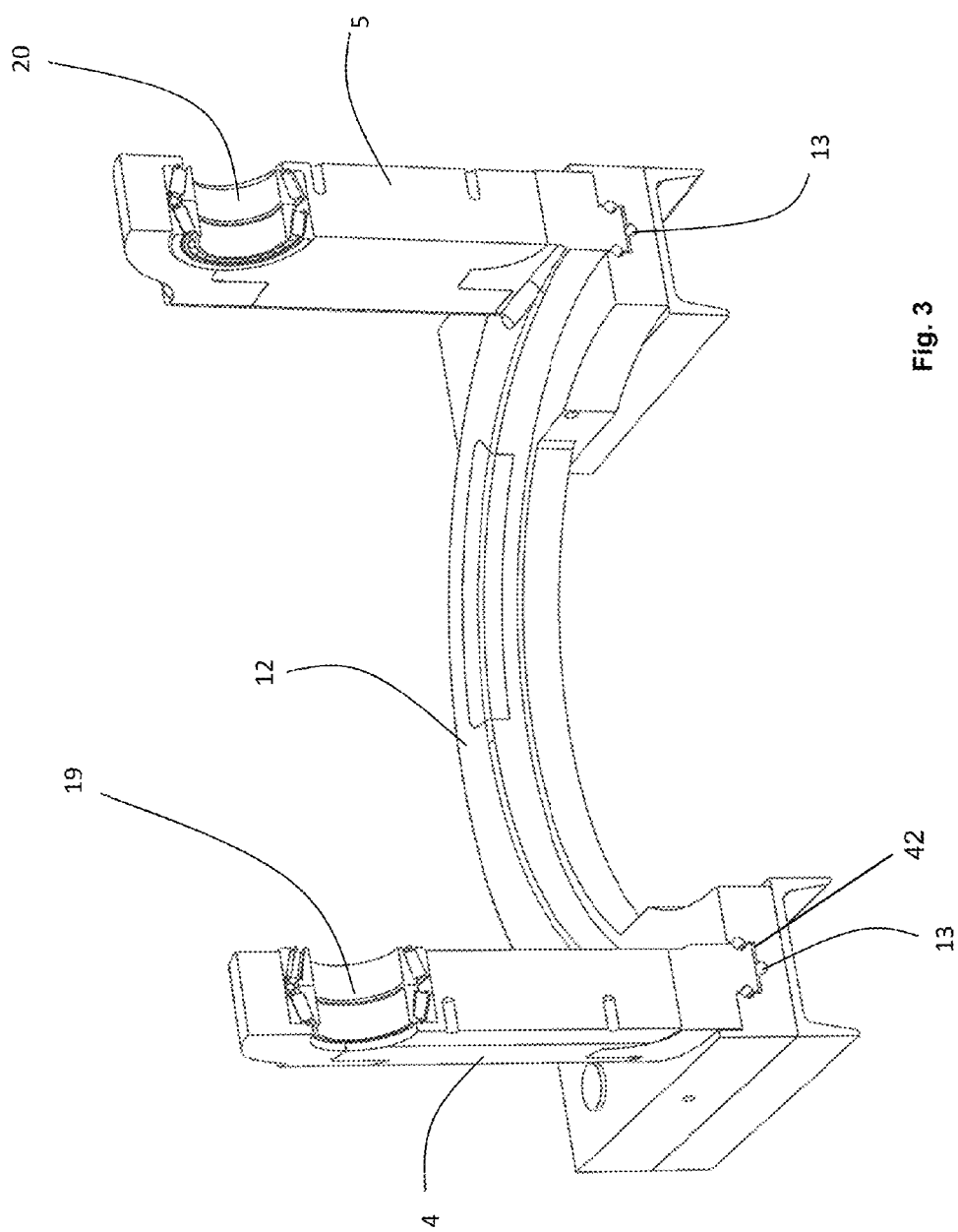
FIG. 3 is the perspective sectional view of the rotating platform and the base.
Figure 4:
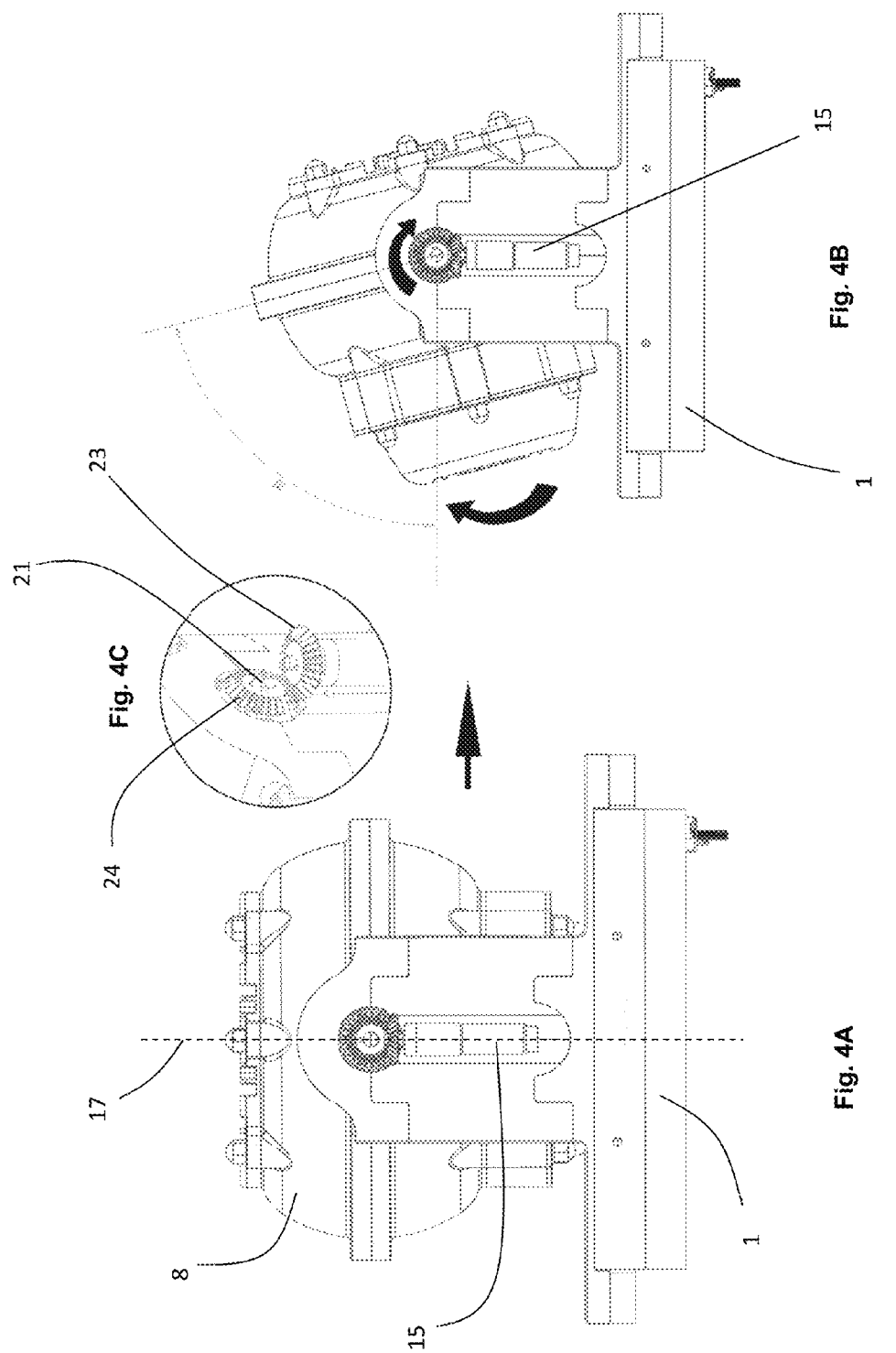
FIG. 4A is the side view of the roll stabilizing device according to the invention.
FIG. 4B is the side view of the roll stabilizing device according to the invention during swinging.
FIG. 4C is a detail view of the gears of the torque applying device.
Figure 5:
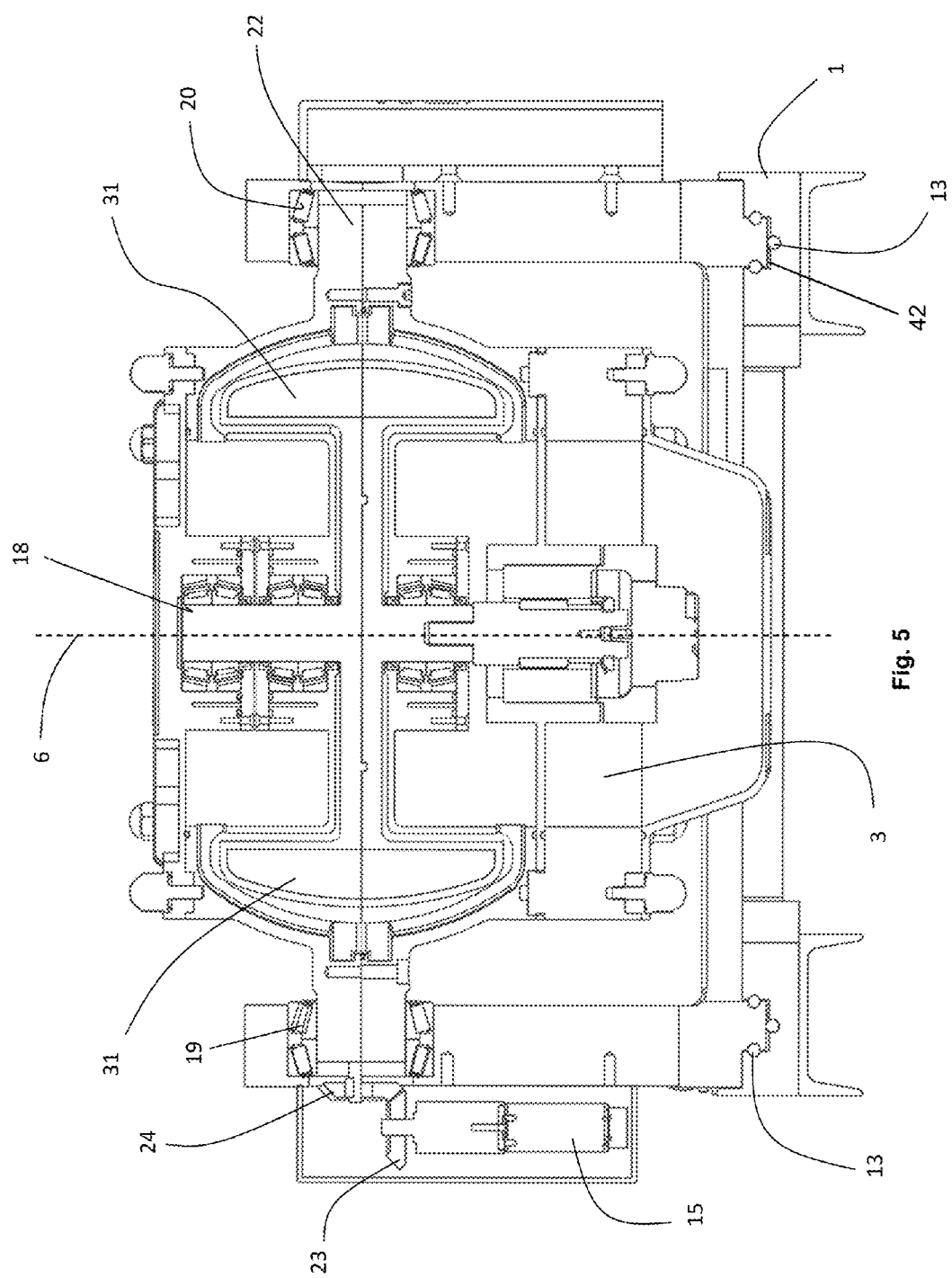
FIG. 5 is the cross-section view of the roll stabilizing device according to the invention.

Disposed in the swing container (8) is a motor (3) communicating with a rotor shaft (18) for rotating thereof. The swing container (8) and thus the rotor (2) are rotated around a swing axis (7) by a torque applying device (9). The torque applying device (9) comprises a torque shaft (15) which is connected to a torque motor (not necessarily shown in the figures) from one end and which has a conical torque shaft gear (23) on the other end. As seen in FIGS. 2 and 4C, there is provided a first container bearing shaft gear (24) at the end of the first container bearing shaft (21) and this operates with the torque shaft gear (23). When the torque shaft (15) is driven by the torque motor, it rotates the first container bearing shaft (21) and thus the swing container (8) is enabled to swing.

The torque applying device (9) can optionally be arranged on the side where the second container bearing shaft (22) is placed, or on both the side of the first container bearing shaft (21) and the side of the second container bearing shaft (22) in such a way to operate in synchronization with one another.

It is clear for the one skilled in the art that except for the one mentioned above, a torque applying device (9) comprises a hydraulic piston disclosed in U.S. Pat. No. 6,973,847 which can also be used. On the other hand, a passive precession brake as disclosed in U.S. Pat. No. 5,628,267 can be used instead of an active torque applying device (9).

Gyroscopic component (44), that comprises the swing container (8) having the rotor (2) and the motor (3), the torque applying device (9), the first support member (4) and the second support member (5), is rotated around the axis (17) corresponding to the state where the rotor (2) does not swing by an actuating mechanism (10) relative to the base (1). Gyroscopic roll stabilizing device (46) swings in the direction of gravity when for instance the rotor (2) is in a configuration where the axis (17) extends in vertical direction (while not swinging). In the scope of the invention, the term that the rotor (2) does not swing refers to the position where the swing container (8) stays free before starting a swing.

According to an embodiment of the invention, the actuating mechanism (10) comprises an actuating mechanism motor (25), a threaded longitudinal actuating mechanism shaft (26) which is connected to the motor (25), a slide (27) movable linearly on the actuating mechanism shaft (26). Such an actuating mechanism (10) is commercially available by Maxon company with the product name "spindle drive". The actuating mechanism motor (25) is fixed to the base (1) and the slide (27) moving on the actuating mechanism shaft (26) communicates with a connector (28) of a rotating platform (12) carrying the gyroscopic component (44) thereon.

The rotating platform (12) has preferably a circular shape and is pivotably supported to the base (1) by means of a plurality of balls (13) provided annularly in an annular cavity (42) formed in the base (1). The rotation axis of the rotating platform (12) is coaxial with the axis corresponding to the state where the rotor does not swing (17). The rotating platform (12) is preferably rotatable between 0° to 90°. 0° corresponds to the position of the rotating platform (12) for damping, for instance when roll occurs completely around the longitudinal axis of the marine vessel, while 90° corresponds to the position of the rotating platform (12) for damping when roll occurs completely around the transversal axis of the marine vessel. Any angular value in between these minimum and maximum angles, 0° and 90°, corresponds to a position where the rotating platform (12) will be positioned to damp roll around an axis between the longitudinal axis and transversal axis of the marine vessel.

It is appreciated for the those skilled in the art that various other devices known in the art (such as servo control motor) can be used as the actuating mechanism, instead of the device consisting of the actuating mechanism shaft (26) and a slide (27) that can move linearly thereon.

Angular extent of rotation of the rotating platform (12) is determined by a sensor (11). The sensor (11) is capable of sensing the roll of the marine vessel in longitudinal axis and transversal axis, and any sensor known in the art can be used for such purpose. The sensor (11) can be for example a dual-axis inclination sensor, so that it can detect the acceleration in the roll directions in two axes of the marine vessel. The resultant intensity and direction roll of the inclination obtained in two axes can be determined by the sensor (11) and the calculated roll direction can then be obtained.

Any roll direction to which the actuating mechanism (10) will rotate the rotating platform (12) is already stored in an electronic controller. Preferably, the angular difference between each roll direction following one another can be of small amounts.

It will be appreciated by those skilled in the art that two separate single-axis sensors can be used instead of a dual-axis inclination sensor. It will further be appreciated by those skilled in the art that gyroscope (dual axis or two separate single axis) can be used for detecting rolls of marine vessel instead of inclination sensor (instead of acceleration measurement in the axes).

The electronic controller communicating with the sensor (11) controls the actuating mechanism (10) by means of a driver circuit.

According to a preferred embodiment of the invention, data provided by the sensor (11) is continuously compared to a predetermined threshold roll value stored in the electronic controller and if the threshold roll value is exceeded, roll damping operation is initiated. The direction imparting maximum roll to the marine vessel is determined by the sensor (11) and the gyroscopic component (44) is rotated to the determined direction by the actuating mechanism (10) and then the rotating rotor (2) is swung by means of the torque applying device (9). Swing is preferably made between 0° and 75°. If a separate (new) roll direction develops to be damped, it is preferred to terminate the swinging of the swing container (8) before rotating it to the new direction or to wait until it comes to a swing movement close to terminating. Yet, while the swing container (8) is swinging, the actuating mechanism (10) would need more power to rotate the rotating platform (12). Swinging termination of the rotating platform (12) or waiting until it comes to a swing movement close to terminating can be detected by the sensors (11) associated with the torque applying device (9).

According to the preferred embodiment of the invention, the electronic controller is in communication with the torque applying device (9) electronically. The amount of swing and/or swing speed provided by the torque applying device (9) to the rotor (2) is preferably controlled by the signals produced from the electronic controller in response to the data taken from the sensor (11) corresponding to the amount of the roll.

Similarly, the electronic controller is in electronic communication with the motor (3) which rotates the rotor (2). The motor speed rotating the rotor (2) is controlled by the signals produced from the electronic controller in response to the data taken from the sensor (11) corresponding to the amount of roll. According to an embodiment of the invention, the electronic controller may not be communicating with the motor (3); in that case the motor (3) can be operated at a certain speed (e.g. 10.000 rpm) for a roll damping operation.

Figure 8B:
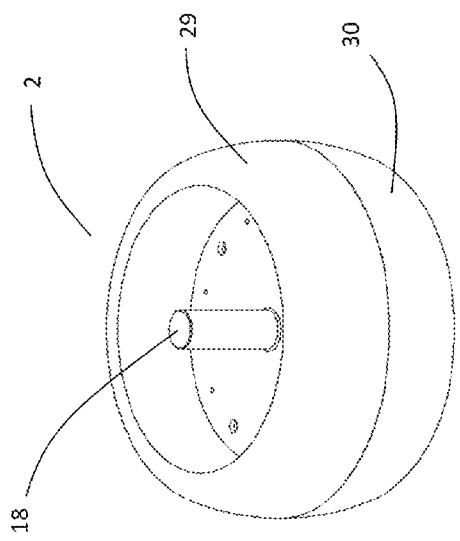
FIG. 8B is the side view of the rotor.
Figure 8D:
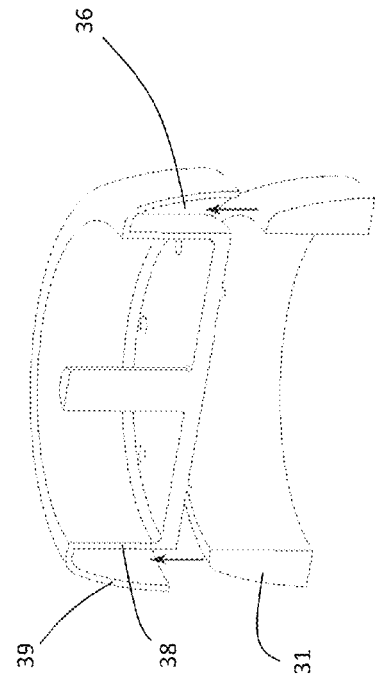
FIG. 8D is a perspective cross-section view of the rotor upper part and the rotor upper inner core.
Figure 8A:
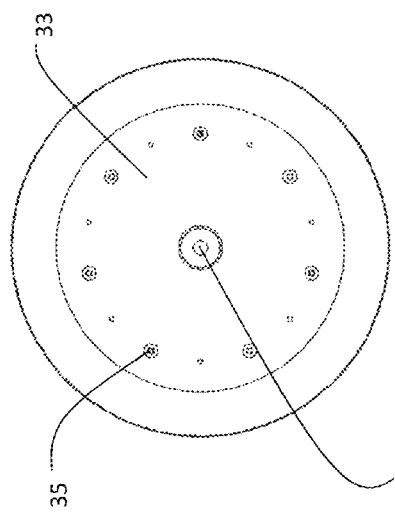
FIG. 8A is the top view of the rotor.
Figure 8C:
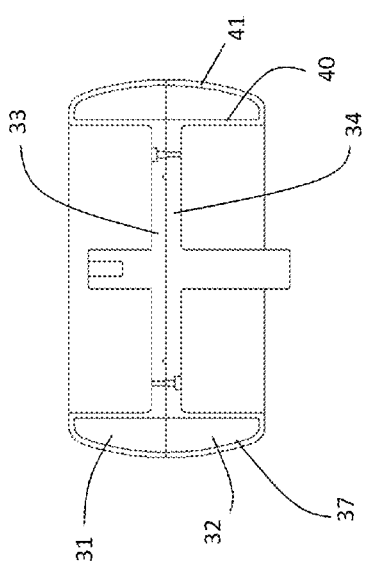
FIG. 8C is the cross-section view of the rotor.

The rotor (2) may be in the type known in the art (e.g. as shown in U.S. Pat. No. 6,973,847 and U.S. Pat. No. 5,628,267) or may include a material with a high specific gravity (e.g. lead or lead alloy) arranged outwardly from the rotor center annularly in order to provide the desired moment effect in lower motor rotations. As seen in FIG. 8B, the rotor (2) comprises a rotor upper part (29) and a rotor lower part (30) attached to one another in the direction of rotor rotation axis. According to an embodiment wherein the rotor shaft (18) is in an integrated form with the rotor (2), one end of the rotor shaft (18) is in an integrated part with the rotor upper part (29) and the other end is in an integrated part with the rotor lower part (30).

The rotor upper part (29) has a rotor upper part attachment surface (33) having a disc form and similarly the rotor lower part (30) has a rotor lower part attachment surface (34) having a disc form. The rotor upper part attachment surface (33) and the rotor lower part attachment surface (34) have attachment holes (35) through which connection members such as bolts can pass through.

The rotor upper part (29) comprises a rotor upper part housing (36) annularly spaced apart from the center. The rotor upper part housing (36) stands between a rotor upper part inner wall (38) and a rotor upper part outer wall (39) and the inner wall (38) and the outer wall (39) are coupled to one another at the upper part of the housing (36).

Similarly, the rotor lower part (30) comprises a rotor lower part housing (37) annularly spaced apart from the center. The rotor lower part housing (37) stands between a rotor lower part inner wall (40) and a rotor lower part outer wall (41) and the inner wall (40) and the outer wall (41) are coupled to one another at the upper part of the housing (37).

A rotor upper inner core (31) with a high specific gravity is placed into the rotor upper part housing (36) by inserting thereof through a recess at the lower part of the housing (36). The inner geometric form of the rotor upper part housing (36) walls is complementary with the rotor upper inner core (31) outer surface form. Similarly, a rotor lower inner core (32) made of the same material is placed into the rotor lower part housing (37) by inserting thereof through a recess at the upper part of the housing (37). The inner geometric form of the rotor lower part housing (37) walls is complementary with the rotor lower inner core (32) outer surface form. Instead of manufacturing rotor upper inner core (31) separately from rotor upper part (29) and placing it into the rotor upper part housing (36), upper part of the rotor (2) can be fully obtained by casting in molten form into the upper part housing (36) after it solidifies. The rotor lower part (30) with its rotor lower inner core (32) can be formed similarly.

When the rotor upper part (29) is to be attached with the rotor lower part (30), the rotor upper part attachment surface (33) lower portion, the rotor lower part attachment surface (34) lower portion lean towards one another and the attachment holes (35) on the surfaces are aligned. In this case, rotor upper inner core (31) and rotor lower inner core (32) lean to each other along their lower surfaces. Then, connecting means such as bolts are passed through the rotor attachment holes (35) and screwed. When rotor upper inner core (31) and rotor lower inner core (32) are attached, they together define a toroid-like form.

The invention claimed is:

1. A gyroscopic roll stabilizing device for a marine vehicle, comprising:

a base (1) communicating with a gyroscopic component comprising a rotor (2) rotatable about a rotor rotation axis (6), a motor (3) for rotating the rotor (2) about the rotor rotation axis (6), a swing container (8) swinging relative to a swing axis (7), said rotor (2) being disposed in said swing container (8), said base (1) having a first support member (4) and a second support member (5) positioned opposite to the first support member (4) said first support member (4) and said second support member (5) supporting the swing container (8), wherein the gyroscopic roll stabilizing device further comprises an actuating mechanism (10) constructed and arranged to rotate said gyroscopic component about an axis (17) prior to said swing container (8) and said rotor (2) swinging relative to said first support member (4) and said second support member (5).

2. The gyroscopic roll stabilizing device according to claim 1, further comprising a torque applying device (9) communicating with the swing container (8) wherein said torque applying device (9) imparts swinging motion to said swing container (8).

3. The gyroscopic roll stabilizing device according to claim 1, said base further comprising a rotating platform (12).

4. The gyroscopic roll stabilizing device according to claim 3, the actuating mechanism (10) comprising a motor (25), a shaft (26) coupled to the motor (25), and a slide (27) movable linearly on the shaft (26), the slide (27) being engaged to the rotating platform (12).

5. The gyroscopic roll stabilizing device according to claim 4, wherein the rotating platform (12) comprises an annular cavity (42), and the rotating platform (12) is supported in said annular cavity (42) by a plurality of balls.

6. The gyroscopic roll stabilizing device according to claim 1, wherein the gyroscopic component is constructed and arranged for rotation between 0° and 90° relative to said base (1).

7. The gyroscopic roll stabilizing device according to claim 1, further comprising a sensor (11) and an electronic controller communicating with the sensor (11), the electronic controller controlling the actuating mechanism (10).

8. A method for stabilizing roll of a marine vessel with a gyroscopic roll stabilizing device according to claim 1, comprising the process steps of:
utilizing said sensor to detect rolls around a longitudinal axis and a transversal axis of the marine vessel;
calculating a roll intensity and a roll direction for the detected rolls;
rotating the gyroscopic component in response to the calculated roll direction when the roll intensity is higher than a threshold value; and
engaging said rotor to dampen the roll.

9. The method according to claim 8, further comprising:
detecting a second roll around the longitudinal axis and the transversal axis of the marine vessel;
calculating a second roll intensity and a second roll direction for the second roll;
terminating the swinging of the swing container (8); and
rotating the gyroscopic component in response to the calculated second roll direction when the second roll intensity is higher than the threshold value.

* * * * *